United States Patent Office 3,519,641
Patented July 7, 1970

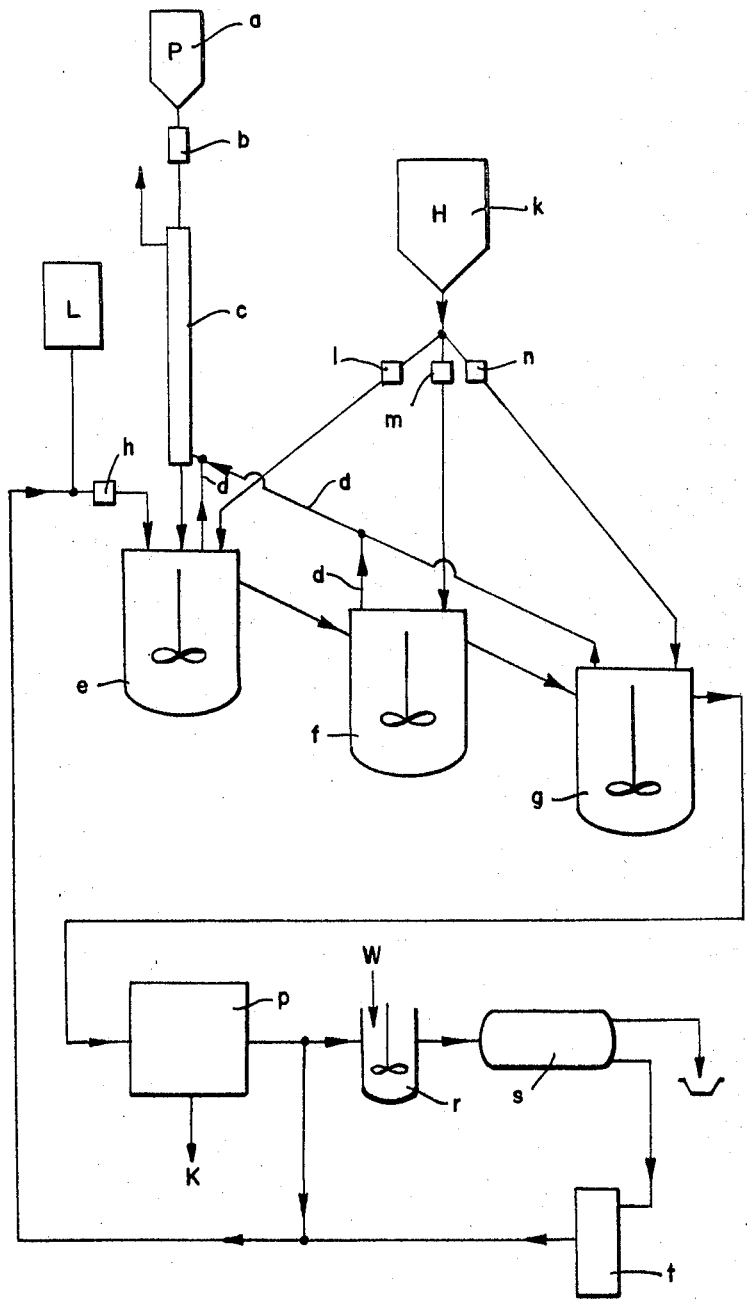

3,519,641
CONTINUOUS PRODUCTION OF COPPER
PHTHALOCYANINES FROM PHTHALIC
ANHYDRIDE AND UREA
Robert Nitzschmann and Hubert Kindler, Ludwigshafen (Rhine), and Gerhard Wellenreuther, Limburgerhof, Pfalz, Germany, assignors to Badische Anilin- & Soda-Fabrik Aktiengesellschaft, Ludwigshafen (Rhine), Germany
Filed June 2, 1967, Ser. No. 643,249
Claims priority, application Germany, June 3, 1966, 1,569,650
Int. Cl. C09b 47/06
U.S. Cl. 260—314.5                        8 Claims

ABSTRACT OF THE DISCLOSURE

A new continuous process for the production of copper phthalocyanines. The starting materials, for example phthalic anhydrides or phthalimides and urea, are continuously added to a series of reaction vessels connected with each other. Reaction time and temperature are kept at optimum levels.

---

This invention relates to a new continuous process for the production of copper phthalocyanines from phthalic anhydride and urea.

Phthalocyanines and particularly copper phthalocyanines are the most important organic blue and green pigments and are manufactured in very large quantities. In the prior art batch method of production, which has hitherto been the only one used, for example phthalic anhydrides are reacted with urea, phthalocyanines being formed by condensation reactions by way of phthalimides and other intermediate stages containing more nitrogen. For each mole of phthalic anhydride, 3 moles of urea are theoretically required; in order to compensate for waste occurring in the reaction however it is necessary to increase the amount of urea. The waste of urea is due to the fact that urea decomposition products are formed. Moreover in the production of phthalocyanines from phthalic acid anhydride and urea there are formed as a matter of course ammonium carbamate, ammonia and carbon dioxide, products whose recovery is uneconomic in a batch process. Furthermore, the formation of deposits of ammonium carbamate gives rise to disturbances in the production of phthalocyanines. In order to make use of the ammonia liberated (which is lost in the batch method) a continuous method is desirable; since in general such a method requires longer reaction periods than the batch method, it would have been expected that still more serious difficulties would be encountered in the production of phthalocyanines owing to increased formation of decomposition products.

We have now found that surprisingly the production of copper phthalocyanines by condensation of phthalic acids, phthalic anhydrides, phthalodiamides or phthalimides (which may bear substituents on the benzene nucleus) with urea in an inert solvent with the addition of copper compounds, and in the presence of catalysts can be carried out with good yields by effecting the condensation continuously in one reactor or a cascade of two to six, preferably three or four, series-connected reactors, for example stirred vessels, the residence time in relation to the total volume of the reactors being one to thirty hours, preferably three to eighteen hours and particularly four to twelve hours, temperatures of from 120° to 220° C., preferably between 170° and 200° C., being maintained and the urea being supplied in portions to advantageously more than one of the reactors and preferably to the first two reactors.

Examples of suitable substituents on the benzene nucleus of the phthalic acids, phthalic anhydrides, phthalic diamides or phthalimides are chlorine atoms; bromine atoms; alkyl groups such as methyl groups or ethyl groups; aryl groups, such as phenyl groups or substituted phenyl groups; sulfonic acids groups; carboxylic acid groups; and nitro groups. The following specific substituted compounds are given by way of examples: 3-monochlorophthalic anhydride, 4-monochlorophthalic anhydride, 3-monochlorophthalimide, 4-monochlorophthalimide, 3-monobromophthalic anhydride, 4-monobromophthalic anhydride, 3-monobromophthalimide, 4-monobromophthalimide, tetrachlorophthalic anhydride, tetrachlorophthalimide, 4-methylphthalimide, 4-methylphthalic anhydride, 4-phenylphthalic anhydride, 4-phenylphthalimide, and the corresponding phthalic anhydrides or phthalimides bearing nitro groups, carboxylic acid groups or sulfonic acid groups as substituents in the 3- or 4-position.

When substituted phthalic acid derivatives are used, the copper phthalocyanines formed as end products bear the same substituents as the derivatives; it is preferred however to use unsubstituted phthalic acid derivatives as starting materials.

The course of the condensation reaction and its intermediate stages are described in the literature. All that need be said here is that the condensation between the carbonyl groups of the phthalic acid derivatives and the amino groups of the urea takes place with the elimination of carbon dioxide, water and ammonia.

In addition to the known advantages of continuous methods over batch methods, the new process has many further advantages, Thus the gas mixture of carbon dioxide and ammonia formed in the reactors through which the reaction mixture flows can be directly reacted with molten phthalic anhydride to form phthalimide. This may be done in a preliminary reactor, for example in a heated packed column. A particular advantage is that the phthalimide formed (which usually contains small amounts of phthalic anhydride) does not have to be purified because unreacted phthalic anhydride will react in subsequent reactors with urea to form phthalimide which will react further to form copper phthalocyanine. This arrangement makes it possible to utilize substantially all of the ammonia formed in the reaction and to decrease the consumption of urea by about 1 mole.

Adding the urea continuously and distributing it to more than one reactor has the advantage that a large excess of urea is avoided and that a shortening of the residence time of the decomposable urea in the reactors is achieved without impairing the dye formation by the decrease in the stationary urea concentration at the beginning of the reaction. By stationary urea concentration we mean the total amount of urea present (in relation to the liquid volume in the reactor) at any given time.

Formation of decomposition products is suppressed to such an extent that the mother liquor, after the copper phthalocyanine has been separated, surprisingly no longer contains any troublesome water-insoluble compounds such as cause disturbances in batch methods. The mother liquor obtained in the continuous method may therefore be recycled to the extent of 50 to 90%, preferably 70 to 80%, without purification. The remainder of the mother liquor may be used again after it has been washed with one to ten times, preferably four to eight times, its weight of water and then dried.

For carrying out the continuous method, an apparatus may be used such as is shown diagrammatically by way of example in the accompanying drawing. The molten phthalic anhydride P is supplied from a reservoir $a$ through a metering means $b$ to a column $c$. This column may have a temperature gradient so that at the top of the column a temperature of about 140° to 280° C. prevails and at the foot of the column a temperature of about 250° to 280° C. prevails, but it is preferred to keep the whole column at from 240° to 280° C. A gas mixture of ammonia and carbon dioxide from reactors $e$, $f$ and $g$ of the cascade of stirred vessels is passed into column $c$ through lines $d$ which are kept at a temperature above 80° C. Phthalimide is formed from phthalic anhydride and ammonia in column $c$ and flows as a molten product into a cascade of stirred vessels (represented by $e$, $f$ and $g$) which may consist of one to six, preferably three or four, stirred vessels. The temperature in the stirred vessels is kept at from 120° to 220° C., preferably between 170 and 200° C.

Within these limits, the temperature may be different in the various stirred vessels, lower temperatures being favorable at the beginning of the cascade and higher temperatures at the end. The total volume of the cascade of stirred vessels is such that the mean residence time is from one to thirty hours, preferably between three and eighteen hours. By mean residence time we mean the statistical average residence time of the molecules in the reaction vessels. The inert solvent L, for example nitrobenzene or trichlorobenzene, is supplied by a metering means $h$ preferably to the first stirred vessel $e$. The ratio of solvent to copper phthalocyanine is adjusted to from 2:1 to 10:1, preferably between 3:1 and 6:1. The copper compounds, for example inorganic or organic salts, such as copper (I) chloride, copper oxychloride, copper (II) chloride or copper acetate, or copper powder, and the catalysts, for example molybdenum (VI) oxide, ammonium molybdate, molybdate, molybdenum carbonyl, tungsten compounds or boric acid, are also supplied to the first stirred vessel. Urea H from a bin $k$ is supplied through metering means $l$, $m$ and $n$ into all the vessels, or preferably the first two vessels of the cascade, the bulk, but at least one-third, of the necessary urea being introduced into the first vessel. The ratio of phthalic acid derivative to urea is advantageously from 1:2.5 to 1:4, depending on which phthalic acid derivative being used as the starting compound. After the insoluble copper phthalocyanine K has been separated from the mother liquor in apparatus $p$, 50 to 90%, preferably 70 to 80%, of the mother liquor is returned without purification to the cascade of stirred vessels $e$, $f$ and $g$. The remainder is scrubbed at 20° to 90° C, preferably at 20 to 40° C., in a stirred vessel $r$ with one to ten times, preferably four to eight times, its weight of water W, separated from the aqueous phase in a separating vessel $s$, dried in the plant $t$ and recycled to the process.

The invention is further illustrated by the following example.

EXAMPLE

A plant as shown in the drawing having a cascade of four stirred vessels each having a capacity of 250 liters, of which the first two are equipped with means for the supply of urea, is so adjusted that the mean residence time of the components is six hours and then the following are supplied continuously per hour:

|  | Kg. |
| --- | --- |
| Phthalic anhydride | 32.8 |
| Urea | 33.2 |
| Copper(I) chloride | 6.08 |
| Molybdenum trioxide | 0.11 |
| Nitrobenzene | 124.8 |

Expressed as molar amounts, the ratio between phthalic anhydride, urea and copper(I) chloride is 1.2.5:0.227.

All the components, including the bulk of the urea (i.e. 25 kg. per hour) are fed into the first vessel and the remaining 8.2 kg. per hour of urea is fed into the second vessel. The temperature in all vessels is kept at 190° C. Under these conditions, 31.2 kg. of copper phthalocyanine is obtained, equivalent to a yield of 97.5% of the theory.

After the dye has been separated by filtration, three-quarters of the mother liquor is recycled without treatment into the first vessel and one-quarter is scrubbed with four times its weight of water in the mixing zone $r$ and separated from the aqueous phase in the separating plant $s$. To dry the nitrobenzene, the water dissolved therein is distilled off azeotropically in the column $t$ and the dry solvent is returned to the process.

We claim:
1. In a process for the production of a copper phthalocyanine with the evolution of an offgas of ammonia and carbon dioxide by condensation of a compound selected from the class consisting of phthalic acid, phthalic anhydride, phthalic diamide, phthalimide and derivatives thereof substituted on the benzene nucleus by four chloro or bromo atoms or by one substituent in the 3- or 4-position selected from the group consisting of chloro, bromo, methyl, ethyl and phenyl, with urea in an inert solvent and with an addition of a copper compound in the presence of a catalyst selected from the class consisting of molybdenum compounds, tungsten compounds and boric acid, the improvement which comprises carrying out the condensation continuously in a reactor consisting of a cascade of two to six series-connected vessels, adjusting the residence time of reagents and products in relation to the total volume of the vessels to one to thirty hours, maintaining temperatures of from 120° to 220° C. in all vessels, adjusting the amount of solvent used to 2 to 10 times the weight of phthalocyanine formed, supplying the copper compound and the catalyst to the first vessel and distributing the continuous supply of urea to at least the first two vessels with at least one third of the urea being supplied to the first vessel.

2. A process as claimed in claim 1 which comprises using a cascade of three to four series-connected vessels with a residence time of three to eighteen hours while maintaining temperatures of from 170° to 200° C. in all vessels and distributing the continuous supply of urea to the first two vessels.

3. A process as claimed in claim 1 wherein the residence time is four to twelve hours.

4. A process as claimed in claim 1 which comprises initially preparing a phthalimide by reacting molten phthalic anhydride or said derivatives thereof bearing said substituents on the benzene nucleus in a preliminary reactor consisting of a packed column heated to a temperature of about 140° C. to 280° C. with the gas mixture of ammonia and carbon dioxide obtained as an offgas in the subsequent continuous condensation of said phthalimide with urea, the offgas being supplied through lines kept at a temperature above 80° C.

5. A process as claimed in claim 1 wherein solid copper phthalocyanine product is separated from the mother liquor in the apparatus as recovered from the last vessel in the series, 50 to 90% of the mother liquor thus separated is recycled without purification and the remainder of the mother liquor is recycled after it has been scrubbed with one to ten times its weight of water and dried.

6. A process as claimed in claim 5 wherein 70 to 80% of the mother liquor is recycled without purification and the remainder is scrubbed with four to eight times its weight of water.

7. A process as claimed in claim 1 wherein the initial phthalic reactant is a compound selected from the class consisting of phthalic anhydride, tetrachloro phthalic anhydride, monophenyl phthalic anhydride, phthalimide, monochloro phthalimide, monobromo phthalimide, tetrachloro phthalimide and monophenyl phthalimide.

8. A process as claimed in claim 1 wherein said inert solvent is a compound selected from the class consisting of nitrobenzene and trichlorobenzene.

References Cited
UNITED STATES PATENTS
2,975,190   12/1956   Roberts et al. _____ 260—314.5

HENRY R. JILES, Primary Examiner

H. I. MOATZ, Assistant Examiner

PO-1050
(5/69)

UNITED STATES PATENT OFFICE
CERTIFICATE OF CORRECTION

Patent No. 3,519,641          Dated July 7, 1970

Inventor(s) Robert Nitzschmann et al

It is certified that error appears in the above-identified patent and that said Letters Patent are hereby corrected as shown below:

Column 6, line 6, in the referendes, "12/1956" should read -- 3/1961 --.

SIGNED AND
SEALED
OCT 20 1970

(SEAL)
Attest:

Edward M. Fletcher, Jr.
Attesting Officer

WILLIAM E. SCHUYLER, JR.
Commissioner of Patents